United States Patent [19]
Ohnishi et al.

[11] Patent Number: 5,180,492
[45] Date of Patent: Jan. 19, 1993

[54] HYDROPHILIC POROUS MATERIAL STERILIZABLE WITH GAMMA-RAY

[75] Inventors: Makoto Ohnishi; Kenichi Shimura, both of Ashigarakami, Japan

[73] Assignee: Terumo Kabushiki Kaisha, Tokyo, Japan

[21] Appl. No.: 716,287

[22] Filed: Jun. 17, 1991

Related U.S. Application Data

[63] Continuation-in-part of Ser. No. 554,467, Jul. 19, 1990, abandoned.

[30] Foreign Application Priority Data

Jul. 21, 1989 [JP] Japan .................................. 1-187319

[51] Int. Cl.$^5$ ........................ B01D 29/00; B01D 39/00
[52] U.S. Cl. ............................... 210/490; 210/500.35; 210/500.36; 428/315.7; 521/54
[58] Field of Search ............. 210/490, 500.35, 500.36; 428/304.4, 315.5, 315.7, 315.9; 521/134, 143, 905, 54

[56] References Cited

U.S. PATENT DOCUMENTS

| | | |
|---|---|---|
| 3,854,982 | 12/1974 | Aeliion et al. |
| 4,131,691 | 12/1978 | Morley et al. ........................ 427/41 |
| 4,143,218 | 5/1979 | Adams et al. .................. 210/500.36 |
| 4,256,782 | 3/1981 | Tazuke et al. ..................... 427/53.1 |
| 4,268,463 | 5/1981 | Aoyagi et al. ................. 210/500.35 |
| 4,717,479 | 1/1988 | Itoh et al. ...................... 210/500.36 |
| 4,761,326 | 8/1988 | Barnes et al. ....................... 428/219 |
| 4,845,132 | 7/1989 | Masuoka et al. ..................... 521/53 |
| 4,917,793 | 4/1990 | Pitt et al. ............................. 210/490 |
| 4,940,541 | 7/1990 | Aoyagi ......................... 210/500.23 |
| 4,959,150 | 9/1990 | Degen ................................ 210/490 |
| 5,028,332 | 7/1991 | Ohnishi .......................... 210/500.36 |

FOREIGN PATENT DOCUMENTS

| | | |
|---|---|---|
| 0077227 | 4/1983 | European Pat. Off. |
| 407900 | 1/1991 | European Pat. Off. ....... 210/500.35 |
| 2058802 | 4/1981 | United Kingdom . |

Primary Examiner—Robert A. Dawson
Assistant Examiner—Sun Uk Kim
Attorney, Agent, or Firm—Burns, Doane, Swecker & Mathis

[57] ABSTRACT

A γ-ray-sterilizable hydrophilic porous material has been found which includes a continuous layer made of a synthetic polymer compound forming a porous substrate and a hydrophilic and γ-ray-resistant polymer supported on at least part of the surface of the porous substrate in an amount not less than 5% by weight, based on the porous substrate. The hydrophilic porous material has an average pore diameter in the range of 0.02 to 20 μm, a porosity in the range of 10 to 90% and a wall thickness in the range of 10 μm to 5.0 mm.

5 Claims, No Drawings

HYDROPHILIC POROUS MATERIAL STERILIZABLE WITH GAMMA-RAY

This is a continuation-in-part application of Ser. No. 554,467, filed Jul. 19, 1990, which is now abandoned.

BACKGROUND OF THE INVENTION

1. Field of the Invention

This invention relates to a hydrophilic porous material sterilizable with γ-rays. More particularly, it relates to a γ-ray-sterilizable hydrophilic porous material which is used for various purposes in the medical field such as purification of blood and separation of blood plasma.

2. Description of the Prior Art

In the application of medial materials to living bodies, sterility is an extremely important consideration as well as safety and bioadaptability. Since clinical use of microorganically contaminated medical materials and medical tools has the possibility that the microorganisms will incite such adverse side effects as fever and infection or diseases, medical materials and medical tools which are incapable of tolerating thorough sterilization are totally worthless no matter how excellent their functions may be.

Heretofore, it has been customary to effect sterilization of medical materials of porous substances by the use of an autoclave or by exposure to ethylene oxide gas. The method of sterilization by the use of an autoclave is complicated operationally and is incapable of sterilizing such medical materials in a large amount at one time. The method of sterilization with ethylene oxide gas entails the problem of residual ethylene oxide gas. On the other hand, the feasibility of a method of sterilization with γ-rays which is simple in operation and free from worry concerning any remnant of used sterilizer has been studied as regards.

When conventional porous materials are sterilized by exposure to γ-rays, the polymer substances forming the porous materials are deteriorated. Consequently, the porous materials lose strength possibly causing inconvenient handling due to the susceptibility of such porous materials to damage or leakage in the course of module assembly and a susceptibility of the materials to loss of resistance to pressure in the course of actual service. Polypropylene type porous materials, for example, are excellent in such properties as chemical resistance, dimensional stability, and mechanical strength and, therefore, are expected to find extensive utility in various medical applications. Since polypropylene rather easily succumbs to cleavage of the main chain and a cross-linking reaction on exposure to γ-rays, however, application of the method of sterilization with γ-rays mentioned should be further studied.

The porous materials made of hydrophobic polymer substances represented by such polypropylene type porous materials as described above indeed excel in such properties as chemical resistance, dimensional stability, and mechanical strength but nevertheless must undergo a treatment to impart hydrophilicity such as by alcohol-water displacement, before the materials are put to use for the treatment of aqueous media. The impartation of hydrophilicity proves to be extremely complicated operationally. Various methods, therefore, have been heretofore proposed for modifying porous materials made of hydrophobic polymer substances, such as by coating their surfaces with such hydrophilic materials as surfactant, polyethylene glycol, and polyvinyl alcohol and cross-linking and insolubilizing them with polymers formed mainly of such hydrophilic monomers as N,N-dimethyl acrylamide, 2-hydroxyethyl methacrylate, and N-vinyl pyrrolidone. The porous materials which have hydrophilicity imparted thereto by these methods, however, are invariably found to induce exudation as a consequence of exposure to γ-rays. Use of these porous materials in medical materials, therefore, may not be safe.

An object of this invention, therefore, is to provide a novel hydrophilic porous material sterilizable with γ-rays.

Another object of this invention is to provide a γ-ray-sterilizable hydrophilic porous material which is used favorably in the medical field for such purpose as purification of blood and separation of blood plasma.

The further object of this invention is to provide a γ-ray-sterilizable hydrophilic porous material which retains practical bursting elongation even after exposure to γ-rays, yields to exudation only sparingly, and ensures high safety.

SUMMARY OF THE INVENTION

The objects described above are accomplished by a γ-ray-sterilizable hydrophilic porous material which comprises a continuous layer made of a synthetic polymer compound forming a porous substrate, and a hydrophilic and γ-ray-resistant polymer supported on at least part of the surface of the porous substrate in an amount not less than 5% by weight, based on the porous substrate. The porous material has an average pore diameter in the range of 0.02 to 20 μm, a porosity in the range of 10 to 90%, and a wall thickness in the range of 10 μm to 5.0 mm.

This invention further discloses a γ-ray-sterilizable hydrophilic porous material, wherein the hydrophilic and γ-ray-resistant polymer is formed substantially of an alkoxyalkyl (meth)acrylate. This invention further discloses a γ-ray-sterilizable hydrophilic porous material, wherein the hydrophilic and γ-ray-resistant polymer is formed substantially of a monomer represented by the following general formula 1:

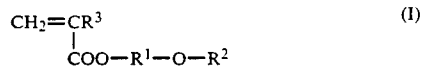

wherein $R^1$ is an alkylene group or a polymethylene group each of 1 to 4 carbon atoms, $R^2$ is an alkyl group of 1 or 2 carbon atoms or an alkoxyalkyl group of 2 to 4 carbon atoms, and $R^3$ is hydrogen atom or methyl group. This invention further discloses a γ-ray-sterilizable hydrophilic porous material, wherein the synthetic polymer compound forming the porous substrate is formed mainly of a polyolefin or a halognated polyolefin and the bursting elongation after exposure to γ-rays is not less than 5%. This invention further discloses a γ-ray-sterilizable hydrophilic porous material, wherein the synthetic polymer compound forming the porous substrate is formed mainly of a polyolefin or a polyvinylidene fluoride and the difference between the absorbance at maximum absorption wavelengths of 350 and 220 nm of the autoclave extract after exposure to γ-rays is not more than 0.1, based on that of the blank.

The porous material of this invention, as described above, is characterized by a continuous layer made of a synthetic polymer compound forming a porous substrate and a hydrophilic and γ-ray-resistant polymer supported on at least part of the surface of the porous substrate in an amount not less than 5% by weight, based on the porous substrate. The porous material has an average pore diameter in the range of 0.02 to 20 μm, a porosity in the range of 10 to 90%, and a wall thickness in the range of 10 μm to 5.0 mm. It possesses sufficient hydrophilicity and exhibits high mechanical strength safety as regards exudation. It, therefore, can be expected to find favorable utility in the medical field such as for purification of blood and separation of blood plasma. Since, the porous material allows effective application of a method of sterilization with γ-rays, it can be sterilized infallibly and rapidly.

The porous material of the present invention acquires further prominent hydrophilicity and γ-ray resistance when the hydrophilic and γ-ray-resistant polymer is formed substantially of an alkoxyalkyl (meth)acrylate or when it is formed substantially of a monomer represented by the general formula I. Further the porous material excels in such physical properties as mechanical strength and chemical resistance when the synthetic polymer compound forming the porous substrate is formed mainly of a polyolefin, a halogenated polyolefin, or a polyvinylidene fluoride. Thus, the material is highly suitable for medical materials.

EXPLANATION OF THE PREFERRED EMBODIMENT

Now, the present invention as embodied will be described in further detail below The γ-ray-sterilizable hydrophilic porous material of the present invention is characterized by having a continuous layer made of a synthetic polymer compound forming a porous substrate and hydrophilic and γ-ray resistant polymer supported on at least part of the surface of the porous substrate in an amount of not less than 5% by weight, based on the porous substrate. The porous material has an average pore diameter in the range of 0.02 to 20 μm, a porosity in the range of 10 to 90%, and a wall thickness in the range of 10 μm to 5.0 mm.

The porous material of the present invention is constructed as described above and, therefore, possesses outstanding hydrophilicity. The expression "possessing hydrophilicity" as used in the present specification refers to the possession by a porous material of at least such a characteristic that when water is allowed to fall gently in drops on the porous material at room temperature (20°±5° C.), it penetrates the pores in the porous material by virtue of its own weight and permeates to the opposite side of the porous material within 5 minutes.

Since the porous material of this invention is constructed as described above, it excels in resistance to γ-rays and precludes the problem of deterioration of mechanical strength and occurrence of exudation after exposure to the γ-rays. Particularly when the porous material is to be used in medical materials, it is preferable to possess a bursting elongation of not less than 5% after exposure to γ-rays and a difference of not more than 0.1, based on that of the blank, between the maximum absorption wavelength of 350 and 220 nm of the exudation by autoclaving after exposure to γ-rays. The expression "exposure to γ-rays" as used in the present specification means the fact that a given porous material is exposed to γ-rays in a dose of 2 Mrads, the magnitude enough for sterilization of the porous material. The term "bursting strength" as used in the present specification represents the magnitude determined with a tensile tester, using a sample 10 mm in width with the chuck distance set at 60 mm. The term "exudation by autoclaving" as used in the present specification represents the quality determined of an extract obtained by placing 1.0 g of a given porous material in 100 ml of high-purity deionized water (based on artificial kidney) and treating the immersed sample in an autoclave at 115° C. for 30 minutes. This magnitude contemplated by the present invention, therefore, may well be regarded as a highly safe criterion because the sample would have produced a smaller extract under the conditions employed popularly.

The shape to be given to the hydrophilic porous material of this invention is not specifically defined but may be a hollow fiber, a flat membrane, or a ring, for example. The wall thickness of the porous material is defined by the range of 10 μm to 5.0 mm. The reason for this range is that the porous material does not allow easy handling in terms of strength when the thickness is less than 10 μm and that the treatment for surface improvement with a hydrophilic and γ-ray-resistant polymer to be performed as described hereinafter possibly proceeds nonuniformly in the direction of wall thickness and modules incorporating the hydrophilic porous material gain intolerably in volume when the wall thickness exceeds 5.0 mm. The average pore diameter is defined by the range of 0.02 to 20 μm. The reason for this range is that the treatment to be given to the interior of membrane is attained only with difficulty when the average pore diameter is less than 0.02 μm and that the porous material does not allow easy handling on account of deficiency in strength. The porosity is defined by the range of 10 to 90%. The reason for this range is that the porous material does not acquire sufficient perviousness to air or liquid and retards the clinical treatment with the porous material when the porosity is less than 10% and that the porous material possibly suffers from deficiency in practically tolerable strength because the continuous phase is extremely deficient in thickness and volume.

In the hydrophilic porous material of the present invention, various synthetic polymer compounds are available for the formation of the porous substrate. These compounds will, however, preferably possess highly satisfactory physical and chemical characteristics. Specifically, such synthetic polymer compounds include polyolefins such as polyethylene and polypropylene, partially chlorinated or fluorinated polyolefins such as ethylene-dichlorodifluoroethylene copolymers, polyamides such as nylon 6 and nylon 6,6, saturated polyesters such as polyethylene terephthalate, polyacrylonitrile, and polyvinylidene fluoride, for example. Among other synthetic polymer compounds mentioned above, polyolefins, halogenated polyolefins, and polyvinylidene fluoride prove to be particularly desirable.

The hydrophilic and γ-ray-resistant polymer to be retained on at least part of the surface of the continuous phase of the porous membrane forming the substrate is preferably formed substantially of an alkoxyalkyl (meth)acrylate. Among numerous alkoxyalkyl (meth)acrylates which are available, particularly preferred are those represented by the following general formula I:

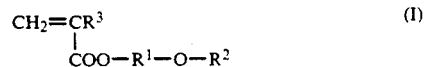

wherein $R^1$ is an alkylene of 1 to 4 carbon atoms such as $CH_2$, $C_2H_4$, $C_3H_4$ or $C_4H_8$ or a polymethylene group, $R^2$ is an alkyl group of 1 or 2 carbon atoms such as $CH_3$ or $C_2H_5$ or an alkoxyalkyl group of 2 to 4 carbon atoms such as $C_2H_4OC_2H_5$, $C_2H_4OCH_3$, $CH_2OC_2H_5$, or $CH_2OCH_3$, and $R^3$ is hydrogen atom or methyl group). Those of the acrylate type are especially preferable. The alkoxyalkyl (meth)acrylates which are usable herein specifically include methoxymethyl (meth)acrylates, methoxyethyl (meth)acrylates, methoxypropyl (meth)acrylates, methoxybutyl (meth)acrylates, ethoxymethyl (meth)acrylates, ethoxyethyl (meth)acrylates, ethoxypropyl (meth)acrylates, ethoxybutyl (meth)acrylates, (2-ethoxyethoxy)methyl (meth)acrlates, diethylene glycol monoethyl ether (meth)acrylates, 3-(2-ethoxyethoxy)propyl (meth)acrylates, 4-(2-ethoxyethoxy)butyl (meth)acrylates, (2-methoxyethoxy)methyl (meth)acrylates, diethylene glycol monomethyl ether (meth)acrylates, 3-(2-methoxyethoxy)propyl (meth)acrylates, 4-(2-methoxyethoxy)butyl (meth)acrylates, dimethylene glycol monoethyl ether (meth)acrylates, 2-(ethoxymethoxy)ethyl (meth)acrylates, 3 -(ethoxymethyoxy)propyl (meth)acrylates, 4 (ethoxymethoxy)butyl (meth)acrylates, dimethylene glycol monomethyl ether (meth)acrylates, 2-(methoxymethoxy)ethyl (meth)acrylates, 3-(methoxymethoxy)propyl (meth)acrylates, and 4-(methoxymethoxy)butyl (meth)acrylates, for example.

The polymerizable monomer is only required to be formed mainly of at least one monomer selected from the monomers mentioned above.

Though the retention of the hydrophilic and γ-ray-resistant polymer on at least part of the surface of the continuous layer formed of a synthetic polymer compound forming the aforementioned porous substrate may be attained by physically coating the surface with the polymer, it is preferably attained by binding the polymer in the form of a graft chain to the at least part of the surface of the continuous phase of the porous substrate. Though various methods are available for the purpose of surface grafting of the polymer, this surface grafting is preferably carried out by a method which comprises exposing a porous membrane destined to form the substrate to low-temperature plasma and then allowing the porous membrane to contact a monomer supplied thereto in a gaseous form thereby inducing graft polymerization of the monomer and binding a preferable polymer chain to the porous membrane by virtue of the resultant graft polymerization (U.S. Pat. No. 4,845,132).

For the porous material of the present invention, it is necessary that the hydrophilic and γ-ray-resistant polymer should be retained as described above in an amount exceeding 5% by weight, preferably falling in the range of 10 to 50% by weight, based on the amount of the porous substrate. If the amount of the polymer to be retained is less than 5% by weight, there is a fair possibility that the produced porous material will not acquire fully satisfactory hydrophilicity and will suffer from deficiencies in physical properties. Further, if the amount exceeds 50 % by weight, properties of the substrate sometimes decrease (for example, pores are blocked.)

Now, the present invention will be described more specifically below with reference to working examples.

EXAMPLE 1 to 4 AND CONTROLS 1 to 4

By a biaxial extruding device, 100 parts by weight of a mixture of two species of polypropylene having melt indexes of 30 and 0.3 (weight ratio 100:40), 400 parts by weight of liquid paraffin (number average molecular weight 324), and 0.3 part by weight of 1,3,2,4-bis(p-ethylbenzylidene) sorbitol as a crystal seed forming agent were melted and kneaded and pelletized. In the same extruding device, the pellets were melted, extruded into the ambient air through a T-die having a slit width of 0.6 mm, led into a cooling and solidifying liquid by the rotation of guide rollers of a cooling liquid tank installed directly under the T-die, and taken up. A fixed length of the film was cut out, fixed at the opposite longitudinal ends thereof, immersed a total of four times each for 10 minutes in 1,1,2-trichloro-1,2,2-trifluoroethane thereby expelling the liquid paraffin by extraction therefrom, and heat-treated in the air at 135° C. for two minutes, to obtain a porous polypropylene membrane having an average pore diameter of 0.6 μm, a porosity of 69%, and a wall thickness of 130 μm.

Subsequently, the porous membrane produced as described above was exposed to a low-temperature plasma (Ar, 0.1 Torr) for 10 seconds and allowed to contact a monomer as indicated in Table 1 in the gaseous phase under the temperature condition of 14.85° C. (288K) to effect surface graft polymerization. The graft polymerized porous membrane was washed with a solvent (methanol) for two days and dried.

The graft-treated porous material thus obtained was tested for hydrophilicity, bursting elongation after γ-ray exposure, and difference of absorbance at maximum absorption wavelength at 350–220 nm of an autoclave extract after the γ-ray exposure. The results are shown in Table 1.

The various tests mentioned above were carried out as follows.

Test for hydrophilicity

Water was allowed to fall gently in drops at room temperature (20°±5° C.) onto a sample porous material and permeate into the pores in the porous material under its own weight. When the permeating water reached the opposite surface of the sample porous material, this porous material was rated as +.

Test for bursting elongation

This property was determined by irradiating a sample porous material with γ-rays at a dose of 2 Mrads while stretching the sample with a tensile tester (produced by Toyo Seiki K. K. and marketed under trademark designation of "Strograph T"), with a sample width fixed at 10 mm and a chuck distance at 60 mm.

Test for exudation by autoclaving

This test was performed by irradiating a sample porous material with γ-rays of a dose of 2 Mrads, cutting a portion 1.0 g in weight from the porous material, placing the portion in 100 ml of high purity deionized water, autoclaving the immersed portion under the conditions of 115° C. and 30 minutes prescribed as standards for an artificial internal organ, measuring the absorbance at the maximum absorption wavelengths of the exudation at 350 to 220 nm, and finding the difference, UV, from a blank (deionized water which has undergone autoclaving treatment).

Control 5

Porous polypropylene membranes produced by following the procedures of Examples 1 to 4 were subjected, without the graft treatment, to the same tests as in Examples 1 to 4. The results are shown in Table 1.

TABLE 1

| Example | Monomer | Hydrophilicity | Elongation at break (after exposure to γ-rays) | ΔUV (after exposure to γ-rays) |
| --- | --- | --- | --- | --- |
| Example 1 | Methoxyethyl acrylate | + | 9.1 | 0.017 |
| Example 2 | Methoxymethyl acrylate | + | 10.3 | 0.020 |
| Example 3 | Ethoxyethyl acrylate | + | 9.6 | 0.014 |
| Example 4 | Methoxybutyl acrylate | + | 10.5 | 0.021 |
| Control 1 | Dimethyl acrylamide | + | 3.4 | 0.178 |
| Control 2 | Acrylic acid | +[*1] | 2.3 | 0.158 |
| Control 3 | Methacrylic acid | +[*1] | 1.8 | 0.182 |
| Control 4 | 4-Vinyl pyridine | +[*2] | 2.1 | 0.093 |
| Control 5 (Blank) | — | — | 1.1 | 0.047 |

[*1] After conversion into sodium salt form
[*2] After quaternization with bromoethane It is clearly noted from Table 1 that the porous materials according with the present invention (Examples 1 to 4) invariably exhibited hydrophilicity, possessed certain degrees of elongation even after exposure to γ-rays, and showed low magnitudes of ΔUV of the autoclave extracts, indicating the possession of resistance to γ-rays. In contrast, the porous materials of Controls 1 to 4, though exhibiting hydrophilicity acquired owing to the introduction of a hydrophilic graft chain to the surfaces, showed an occurrence of exudations in large volume after exposure to γ-rays and showed low elongations at break. The untreated porous polypropylene material (Control 5) showed notably inferior physical properties after exposure to γ-rays and a very low elongation at break of 1.1%, indicating that this porous material did not possess the practically necessary strength.

EXAMPLE 5-8 AND CONTROL 6-9

Water permeabilities, average pore diameters, porosities, coating ratios and thicknesses of the graft-treated porous materials obtained in Examples 1-4 and Control 1-4 were measured. The results are shown in Table 2. Each test was carried out as follows:

Test for water permeability

The porous material sheets were punched off into a disc having 45mm of diameter and deionized water was flowed though the disc at a temperature of 25° C.±1° C. under a pressure of $6.86 \times 10^4$ Pa. The whole amount was measured after water flowed for a desired time. An untreated sheet having no hydrophilicity was dipped into methanol for one minute, then substituted with water and measured by a similar conditions.

Measurement of average pore diameter

Average pore diameters were obtained by calculation applying the following Hagen-Poiseuille equation on the results obtained by the water permeability.

$$\gamma = \left[ \frac{8 \cdot \zeta \cdot g \cdot d \cdot J}{\pi \cdot Pr \cdot \Delta P} \right]^{\frac{1}{2}} \cdot A$$

where $\zeta$ is viscosity of water(Pa.sec), g is tortuosity, d is thickness(m), J is water permeability($m^3/m^2$.sec). Pr is porosity(%), $\Delta P$ is pressure(Pa), A is coefficient of correction and $\gamma$ is effective average diameter(m).

Measurement of porosity

Porosity was measured by the mercury intrusion method using Carlo Ebra unit 120.

Measurement of Coating Ratio

A polymer was coated on the substrate, and then the polymer was washed with a good solvent, and an amount of the coated polymer per unit weight of the substrate based on weight change was shown by percentage.

Measurement of thickness

Five points or more per 100 cm$^2$ of the thickness of the substrate were measured by a measuring device and the thickness was obtained by the average values.

Examples 9-10

Two kinds of porous membrane made of polypropylene having 0.3μm of average pore diameter, 60% of porosity and 80μm of thickness and 0.1μm of average pore diameter, 45% of porosity and 50μm of thickness respectively were obtained by varying conditions for preparation of the membranes in a similar method in Examples 5 to 8. Then, the porous membrane obtained by this method was graft-treated by a similar methods in Examples 5 to 8 to polymerize methoxyethyl acrylate.

The graft-treated membranes thus obtained were measured by a similar method in Examples 1 to 4 and 5 to 8. The results were shown in Tables 3 and 4.

Controls 10 to 11

Porous membranes made of polypropylene obtained by a similar method in Examples 9 and 10 were subjected to a similar method in Example 9 and 10 without graft-treatment. The results were shown in Tables 3 and 4.

TABLE 2

| | Monomer | Coating ratio (%) | Thickness (μm) | Water permeability ($m^3/m^2$·sec) | Average pore diameter (μm) | Porosity (%) |
| --- | --- | --- | --- | --- | --- | --- |
| Example 5 | Methoxyethyl acrylate | 11.9 | 129 | $4.02 \times 10^{-3}$ | 0.580 | 68.0 |
| Example 6 | Methoxyethyl acrylate | 12.8 | 130 | $4.05 \times 10^{-3}$ | 0.586 | 67.5 |

TABLE 2-continued

| | Monomer | Coating ratio (%) | Thickness (μm) | Water permeability (m³/m²·sec) | Average pore diameter (μm) | Porosity (%) |
|---|---|---|---|---|---|---|
| Example 7 | Ethoxyethyl acrylate | 15.6 | 135 | $3.95 \times 10^{-3}$ | 0.586 | 68.5 |
| Example 8 | Methoxybutyl acrylate | 20.3 | 130 | $3.87 \times 10^{-3}$ | 0.572 | 68.0 |
| Control 6 | Dimethyl acrylamide | 12.5 | 130 | $2.02 \times 10^{-3}$ | 0.414 | 67.9 |
| Control 7 | Acrylic acid[*1] | 4.8 | 128 | $9.35 \times 10^{-4}$ | 0.278 | 68.7 |
| Control 8 | Methacrylic acid[*1] | 4.9 | 128 | $8.98 \times 10^{-4}$ | 0.272 | 68.8 |
| Control 9 | 4-Vinyl pyridine[*2] | 3.0 | 127 | $8.85 \times 10^{-4}$ | 0.268 | 68.9 |
| Blank | — | 0 | 130 | $4.02 \times 10^{-3}$ | 0.598 | 69.0 |

[*1]After changing to sodium salt
[*2]After treating to quaternarize with bromoethan

TABLE 3

| | Monomer | Hydrophilicity | Elongation at break (after γ ray radiation) | ΔUV (after γ ray radiation) |
|---|---|---|---|---|
| Example 9 | Methoxyethyl acrylate | + | 10.2 | 0.020 |
| Control 10 (blank) | — | — | 2.0 | 0.052 |
| Example 10 | Methoxyethyl acrylate | + | 10.5 | 0.030 |
| Control 11 (blank) | — | — | 2.3 | 0.060 |

TABLE 4

| | Monomer | Coating ratio (%) | Thickness (μm) | Water permeability (m³/m²·sec) | Average pore diameter (μm) | porosity |
|---|---|---|---|---|---|---|
| Example 9 | Methoxyethyl acrylate | 11.5 | 81 | $1.92 \times 10^{-3}$ | 0.338 | 68.0 |
| Control 10 (blank) | — | — | 80 | $2.00 \times 10^{-3}$ | 0.342 | 67.5 |
| Example 10 | Methoxyethyl acrylate | 10.9 | 51 | $2.89 \times 10^{-4}$ | 0.118 | 44.3 |
| Control 11 (blank) | — | — | 50 | $3.00 \times 10^{-4}$ | 0.120 | 45.0 |

The present invention has been described with reference to working examples, which are intended to be merely illustrative of and not in any way limitative of the present invention.

What is claimed is:

1. A γ-ray-sterilizable hydrophilic porous composition which comprises:

a porous substrate having a continuous layer made of a synthetic polymer compound and a plurality of fine pores; and a hydrophilic and γ-ray-resistant polymer formed of a monomer containing at least one monomer represented by the following general formula I:

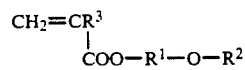

wherein $R^1$ is an alkylene group or a polymethylene group each of 1 to 4 carbon atoms, $R^2$ is an alkyl group of 1 to 2 carbon atoms or an alkoxyalkyl group of 2 to 4 carbon atoms, and $R^3$ is a hydrogen atom or a methyl group, said hydrophilic polymer being formed on at least part of the surface of the porous substrate in an amount not less than 5% by weight, based on the porous substrate, wherein the hydrophilic porous composition has an average pore diameter in the range of 0.02 to 20 μm, a porosity in the range of 10 to 90% and a thickness in the range of 10 μm to 5.0 mm.

2. A hydrophilic porous composition according to claim 1, wherein said monomer represented by the general formula I is an alkoxyalkyl (meth)acrylate.

3. A hydrophilic porous composition according to claim 2, wherein said synthetic polymer compound is formed substantially of a polyolefin or a halogenated polyolefin, and the hydrophilic porous composition possesses a bursting elongation of not less than 5% after exposure to γ-rays.

4. A hydrophilic porous composition according to claim 1, wherein said synthetic polymer compound is formed substantially of a polyolefin or a halogenated polyolefin, and the hydrophilic porous composition possesses a bursting elongation of not less than 5% after exposure to γ-rays.

5. A hydrophilic porous composition according to claim 1, wherein said synthetic polymer compound is formed substantially of a polyolefin or a polyvinylidene fluoride, and the difference of absorbance between a blank sample and an extract obtained during autoclaving of said porous composition after exposure to γ-rays, is not more than 0.1 when measured at the maximum absorption wavelength between 220 to 350 nm.

* * * * *

UNITED STATES PATENT AND TRADEMARK OFFICE
CERTIFICATE OF CORRECTION

PATENT NO. : 5,180,492

DATED : January 19, 1993

INVENTOR(S) : Makoto OHNISHI et al

It is certified that error appears in the above-identified patent and that said Letters Patent is hereby corrected as shown below:

In Column 1, line 17, delete "medial" and insert -- medical --.

In Column 1, line 23, delete "infection" and insert -- infections --.

In Column 1, line 38, delete "as regards".

In Column 5, line 23, delete "3-(ethoxymethyoxy)-" and insert -- 3-(ethoxymethoxy)- --.

In Column 5, line 24, delete "4(ethoxymethoxy)butyl" and insert -- 4-(ethoxymethoxy)butyl --.

Signed and Sealed this

Twenty-sixth Day of October, 1993

Attest:

BRUCE LEHMAN

Attesting Officer

Commissioner of Patents and Trademarks